United States Patent
Jung et al.

(10) Patent No.: US 8,056,117 B2
(45) Date of Patent: Nov. 8, 2011

(54) NETWORK AND DOMAIN-CREATING METHOD THEREOF

(75) Inventors: Bae-eun Jung, Seongnami-si (KR); Mi-suk Huh, Suwon-si (KR); Maeng-hee Sung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1251 days.

(21) Appl. No.: 11/350,786

(22) Filed: Feb. 10, 2006

(65) Prior Publication Data

US 2007/0177737 A1    Aug. 2, 2007

(30) Foreign Application Priority Data

Feb. 18, 2005 (KR) .................... 10-2005-0013543

(51) Int. Cl.
*G06F 17/30* (2006.01)
*H04L 9/32* (2006.01)

(52) U.S. Cl. ............ 726/2; 713/169; 713/170; 380/270; 726/26; 726/29

(58) Field of Classification Search .......... 713/188, 713/153–154, 155–159, 168–174, 182–186; 709/229, 249, 389, 226; 726/22–25, 26–33, 726/2, 18; 380/28–30, 255–283, 233; 345/169
See application file for complete search history.

(56) References Cited

U.S. PATENT DOCUMENTS

| | | | | |
|---|---|---|---|---|
| 6,791,467 B1 * | 9/2004 | Ben-Ze'ev | ............... | 340/825.69 |
| 7,143,136 B1 * | 11/2006 | Drenan et al. | ................ | 709/204 |
| 7,454,619 B2 * | 11/2008 | Smetters et al. | ............... | 713/171 |
| 7,668,533 B2 * | 2/2010 | Hagiwara | ...................... | 455/411 |
| 2002/0115426 A1 * | 8/2002 | Olson et al. | .................... | 455/410 |
| 2003/0235309 A1 * | 12/2003 | Struik et al. | ................... | 380/278 |
| 2003/0237088 A1 * | 12/2003 | Macrae et al. | .................. | 725/25 |
| 2004/0006647 A1 * | 1/2004 | Kim et al. | ..................... | 709/249 |
| 2005/0075986 A1 * | 4/2005 | You et al. | ......................... | 705/71 |
| 2005/0120216 A1 * | 6/2005 | Lee et al. | ....................... | 713/171 |
| 2006/0155802 A1 * | 7/2006 | He et al. | ........................ | 709/203 |
| 2006/0251256 A1 * | 11/2006 | Asokan et al. | ................ | 380/270 |

FOREIGN PATENT DOCUMENTS

CA      2143352 A1 *  8/1996
WO   WO 2005/006643 A1 *  1/2005

* cited by examiner

*Primary Examiner* — Taghi Arani
*Assistant Examiner* — Mohammad L. Rahman
(74) *Attorney, Agent, or Firm* — Sughrue Mion, PLLC

(57) ABSTRACT

A network capable of communicating with foreign networks and having a plurality of devices capable of mutually communicating with one another and a domain setup method thereof. The network includes at least one main remote controller for, out of the devices, setting up authorization to use the respective devices belonging to at least one main domain having at least one of the devices; and at least one subsidiary remote controller for receiving authentication for authorization to use the respective device belonging to a domain having the respective devices authorized to at least one user by the respective main remote controllers. Thus, the present network enables each user to efficiently administer whether to use the home devices as well as enables the home devices authorized to each user to be set up in one domain in order to keep security and privacy from foreign domains.

18 Claims, 6 Drawing Sheets

NETWORK AND DOMAIN-CREATING METHOD THEREOF

CROSS-REFERENCE TO RELATED APPLICATIONS

This application claims benefit under 35 U.S.C. §119 from Korean Patent Application 2005-13543, filed on Feb. 18, 2005, the entire contents of which are incorporated herein by reference.

BACKGROUND OF THE INVENTION

1. Field of the Invention

The present invention relates to a network and a domain-creating method therefor, and more particularly to a network and a domain-creating method thereof capable of efficiently administering users who have access to home devices as well as enabling users to form a plurality of home networks in one home network.

2. Description of the Related Art

In general, the home network system refers to a network system built at home for communicating with foreign networks so as to enable intelligent communications, and such a network system maximizes the sharing of information resources and the use of individual products at home.

The home network of the home network system connects diverse home devices in a wired or a wireless manner, and the home devices can be classified into information-related devices such as personal computers, facsimile machines, scanners, printers, etc., A/V devices such as TVs, set-top boxes, DVDs, VCRs, audio devices, camcorders, home game machines, etc., control-related devices such as coffee makers, electric rice cooker, refrigerators, washing machines, microwave ovens, cameras, etc., and dummy devices such as remote controllers, interphones, sensors, lights, etc.

The individual home devices constituting the home network form one network in general, and home network users share all the home devices together. However, depending on the features of the home devices, the home devices can be intended to be used only by its owner or administrator, or to be restricted in use depending on users. For example, if a network contains a printer, a DB server, a TV, etc., and the printer, DB server, and TV are owned by one person, the owner may want to share the TV and DB server with the other home members, but may want to use the printer only by himself or herself.

To meet the demands of such a user, a method has been proposed in which an administrator of a home network sets home devices to be available or unavailable to individual home network users. However, such a method has difficulties in use when a plurality of family members or room mates are administered by one user who can access a home network, because it is impossible for one administrator to set up authorization to use home devices owned or administered by different users since a family member or a room mate may own different home devices.

Therefore, there is a need to develop a method in which each owner or each administrator of home devices of one home network can set up authorization for individual users to use the home devices when there exists different owners or administrators for the home devices of one home network and there exists a plurality of users, enabling the security and privacy to be guaranteed when the users use their home devices.

SUMMARY OF THE INVENTION

The present invention has been developed in order to address the above drawbacks and other problems associated with the conventional arrangement. An aspect of the present invention is to provide a network and a domain-creating method thereof capable of efficiently administering users accessible to home devices as well as configuring a plurality of home networks in one home network with security and privacy guaranteed.

The foregoing and other aspects are substantially realized by providing a network capable of communicating with foreign networks and having a plurality of devices capable of mutually communicating with one another. The network comprises at least one main remote controller for, out of the devices, setting up authorization to use the respective devices belonging to at least one main domain having at least one of the devices; and at least one subsidiary remote controller for receiving authentication for authorization to use the respective device belonging to a domain having the respective devices authorized to at least one user by the respective main remote controller.

The respective main and subsidiary remote controllers mutually share information on a unique public key for identifying the respective remote controllers.

The respective main remote controllers can send to the respective subsidiary remote controllers information on authorization for the individual users to use the respective devices. The respective main remote controllers can send to the respective device information containing a public key of the respective subsidiary remote controllers authorized to use the respective devices.

The respective subsidiary remote controllers have an authentication-requesting unit for sending the respective authorized devices information containing the public key of the respective subsidiary remote controllers and requesting for the authentication for the authorization.

The authentication-requesting unit sends the respective devices the public key of the respective subsidiary remote controllers.

If the authentication-requesting unit requests for the authentication, the respective devices compare the public key of the subsidiary remote controller sent from the main remote controller to the public key sent from the subsidiary remote controller, and decides whether to authenticate the subsidiary remote controller.

If the subsidiary remote controller is authenticated, the respective devices create a secret key to share with the subsidiary remote controller, and send the secret key to the subsidiary remote controller.

If the secret key is completely shared with the respective devices, the respective subsidiary remote controllers create a domain key for communications with the respective devices in the domain, encrypting the domain key by using the secret key of the respective devices, and sending the encrypted domain key to the respective devices.

If the secret key from the respective subsidiary remote controllers is created in the respective devices, the respective devices may perform a command from the subsidiary remote controller, using the domain key, upon communications with the subsidiary remote controller.

Meanwhile, The foregoing and other aspects are substantially realized by providing a user domain setup method for a network capable of communicating with foreign networks and having plurality of devices capable of mutually communicating with one another, comprising steps of setting up at least one main domain having at least one of the devices; setting up authorization for at least one user to use the respective devices belonging to the main domain; authenticating authorization for the authorized user to use the respective authorized devices; setting up in one domain the respective device authorized and authenticated to the user; creating a domain key to be commonly used upon communications with the respective devices in the domain; and sending the domain key to the respective devices and sharing the domain key with the respective devices.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Hereinafter, exemplary embodiments of the present invention will be described with reference to the accompanying drawings.

Figure 1:
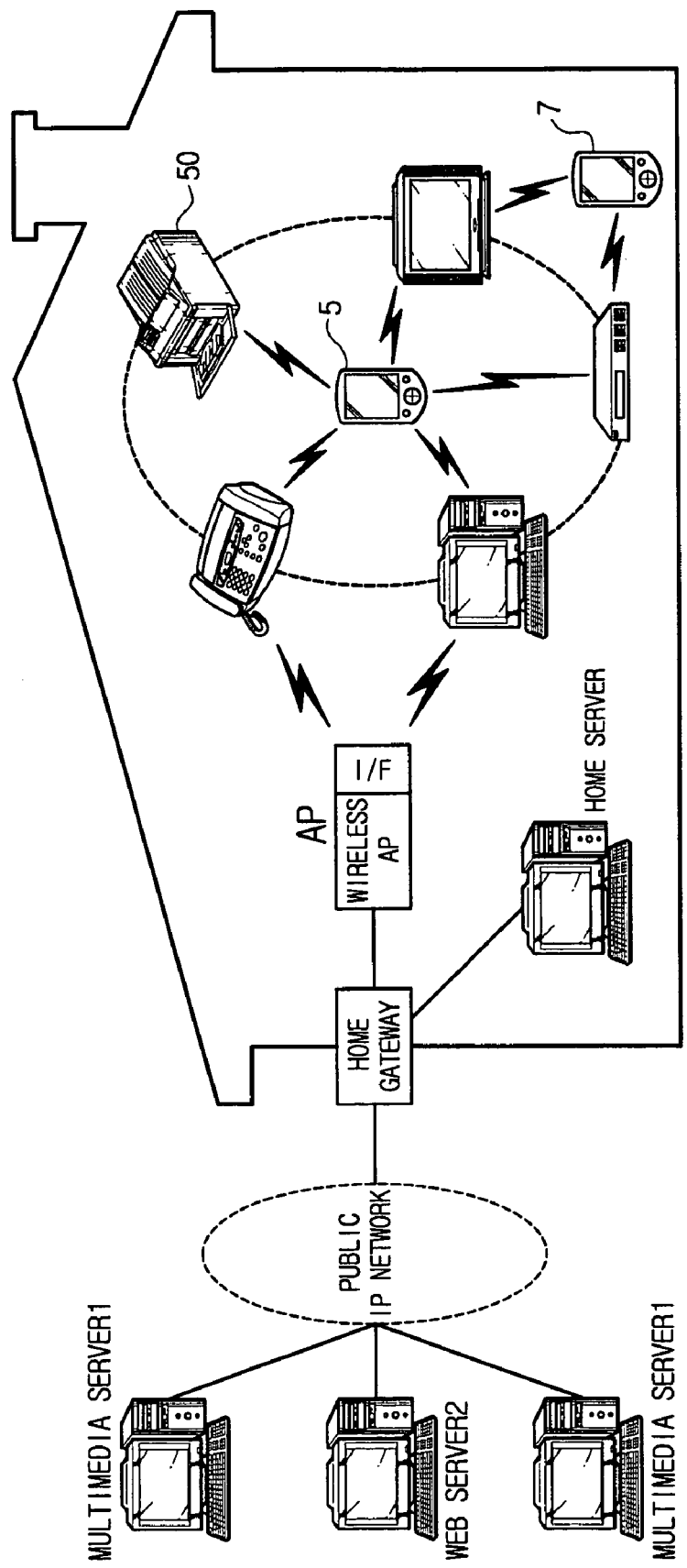
FIG. 1 is a view for showing a home network system.

FIG. 1 is a view for showing a structure of a home network having a plurality of domains according to an exemplary embodiment of the present invention. The present home network has the plurality of home devices 50 belonging to at least one domain and remote controllers 5 and 7 for remotely controlling authentications to and operations of the home devices 50 belonging to a user's domain and for forming a user-dependent domain. Here, the domain refers to the concept of a set of at least one or more home devices 50 to which one user can access, and a domain for each user is determined through setup by a owner or an administrator of the individual home devices 50.

In general, the diverse home devices 50 constituting a home network are connected to one another in a wired or a wireless manner, and the remote controllers for the operations of and authentications to such home devices 50 may be any of diverse input devices such as PDAs, handheld phones, and so on, each having a display unit displaying inputs of a user, and, in the present home network, the remote controllers are referred to as remote controls (RCs) 5 and 7. As many RCs as the number of users is provided in one home network, and is used when each user authenticates to and operates the home devices 50, so one domain set up for each user can be considered a set of the home devices 50 that can be controlled by the RCs 5 and 7.

The RCs 5 and 7 can be classified into the main RC 5 occupied by an owner or an administrator owning or administering at least one home device 50, and the sub-RC 7 of a user accessible to the home devices 50 set by the owner or the administrator. However, the main RC 5 can be the sub-RC 7 depending on occasions since there can be a plurality of owners or administrators in the present home network. For example, the main RC 5 may serve as the sub-RC 7 for other home devices 50 not owned nor administered by the main RC 5, and, likewise, the main RC 5 may serve as the sub-RC 7 for other home devices 50, but may serve as the main RC 5 for the home devices 50 that the main RC 5 itself administers. Thus, all the RCs 5 and 7 for one home network may serve as the main RC 5 or the sub-RC 7 or vice versa, so the RCs 5 and 7 each have the functions of the main RC 5 and sub-RC 7 as well as each serve as the main RC 5 or the sub-RC 7 or vice versa depending on the home devices and the formation of a domain. Further, there can be a plurality of main RCs 5, and, in the circumstances, a domain built with home devices 50 belonging to the main RC 5 is referred to as a main domain.

Figure 2:
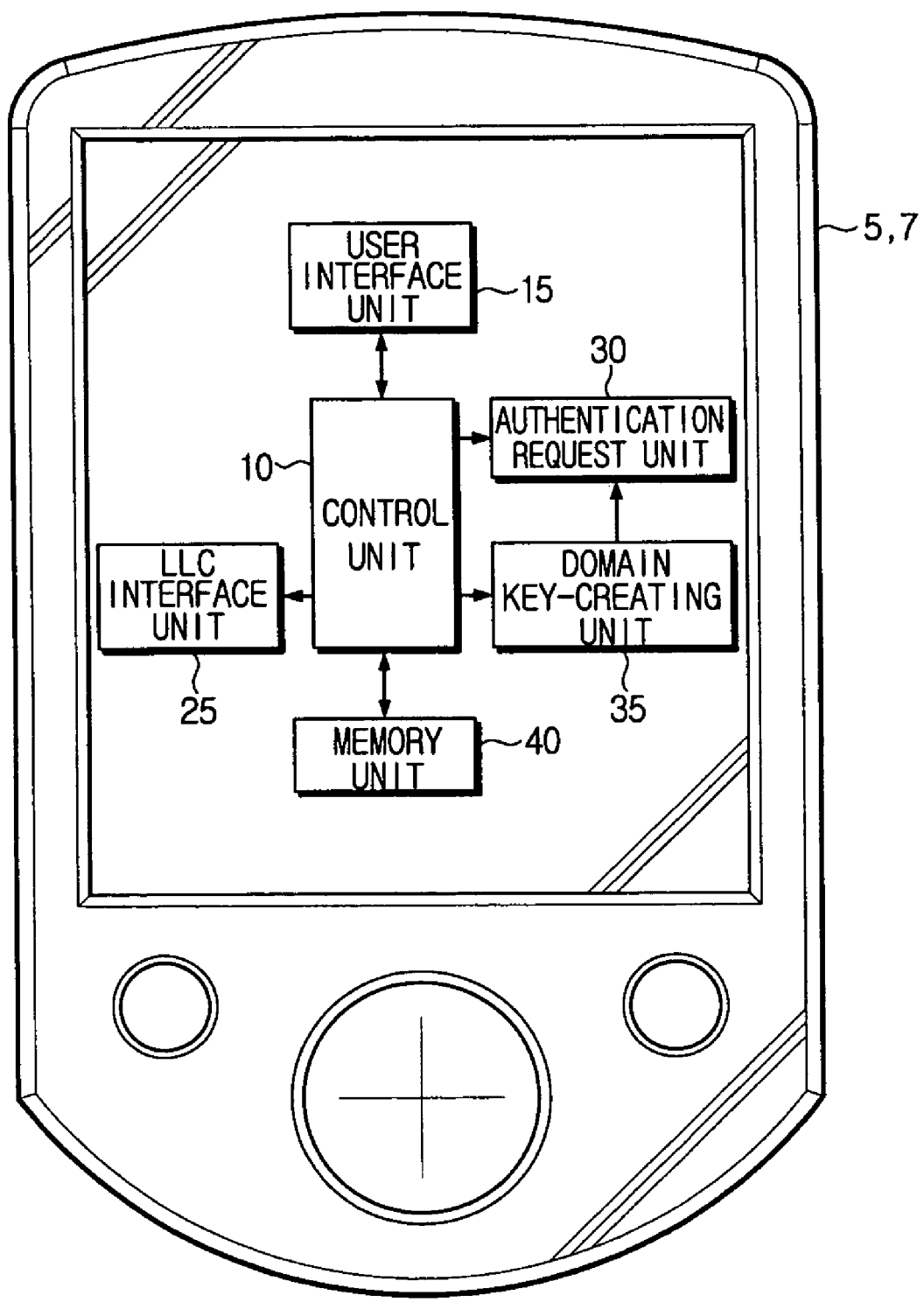
FIG. 2 is a block diagram for showing a structure of an RC according to an exemplary embodiment of the present invention.

As shown in FIG. 2, such an RC 5 or 7 has a memory unit 40, a user interface unit 15, a Location Limited Channel (LLC) interface unit 25, an authentication request unit 30, a domain key-creating unit 35, and a control unit 10.

The memory unit 40 of the RC 5 or 7 stores different information depending on whether the RC 5 or 7 serves as the main RC 5 or the sub-RC 7. If the RC 5 or 7 serves as the main RC 5, the memory unit 40 stores information on home devices 50 forming one domain administered by an owner or an administrator, that is, model numbers of corresponding home devices 50, internal IP addresses, access keys enabling access to the corresponding home devices 50, and so on. Further, the memory unit 40 stores an Access Control List (ACL) which is information on users having authorization to use the home devices 50 set by an owner or an administrator for the individual users belonging to the home network. The ACL list contains information on the sub-RCs 7 owned by the individual authorized users and hash functions of public keys for corresponding sub-RCs 7.

The memory unit 40 of the sub-RC 7 stores personal information on corresponding users, information on home devices 50 to which the users can access, and information on authentications to the home devices 50. The information on the home devices 50 contains device types, vendors, model names, serial numbers, and private IP addresses allocated in the home network, and the authentication information contains information on the public key used in a corresponding domain and secret keys and a domain key which are shared with the authorized home devices 50. As stated above, the RCs 5 and 7 performing the functions of the main RC 5 and the sub-RC 7 stores all the information stored in the memory units 40 of the main RC 5 and the sub-RC 7.

The user interface unit 15 may be a display window, and displays the control status of the home devices 50 and information inputted by an owner or an administrator when an RC serves as the main RC 5 and information inputted by a user when an RC serves as the sub-RC 7. In addition to the display window, the user interface unit 15 may be configured to have separate buttons for information inputs or a touch panel thereon, enabling a user to directly input information with a stylus pen, fingers, or the like.

The LLC interface unit 25 supports wireless communications between the home devices 50 and the RC 5 or 7, and signals cannot be modulated. The home devices 50 and the RCs 5 and 7 share information together, using the LLC interface unit 25, the main RC 5 provides the sub-RC 7 and the home devices 50 with information on authorizations to use the home devices 50 through the LLC interface unit 25, and the sub-RC 7 requests for authentications to the authorized home devices 50 through the LLC interface unit 25.

In the meantime, the process for authentication requested by the authentication request unit 30 at the time when an RC serves as the main RC 5 is somewhat different from that for authentication requested by the same at the time when an RC serves as the sub-RC 7, and, when an RC serves as the sub-RC 7, the authentication request unit 30 requests the home devices 50 for authentication in order to enable a user to use the home devices 50 authorized by the main RC 5.

The authentication request unit 30 of the main RC 5 issues a command requesting the home devices 50 of a main domain to recognize the main RC 5, and the home devices 50 each check whether or not it is registered to a main RC by checking its memory unit. As a result of the check, the home devices 50 each store in the memory unit 40 the information on the main RC 5 provided from the main RC 5 if there does not exist the information on the main RC 5, and creates and sends a secret key to the main RC 5. If the main RC 5 is completely authenticated, the main RC 5 sends to the home devices 50 an ACL list and a MAC1, which are the information on the sub-RCs 7 authorized to use the home devices 50. In here, the MAC1 is a result value of hash functions using a secret key, the ACL list, device information, and nonce received for ACL update from the home devices 50. The home devices 50 check out the MAC1 value, using a secret key shared with the main RC 5 and stored in the memory unit 40, and accept the ACL if both values are the same.

In the meantime, the authentication request unit 30 of the sub-RC 7 requests for authentication to the home devices 50 authorized by a owner or an administrator, and, at the time, sends to the home devices 50 the information on the sub-RC 7 and a unique public key of the sub-RC 7. If the authentication is requested from the sub-RC 7, the home devices 50 check whether there exists information identical to the sub-RC 7 in the ACL list sent from the main RC 5. If there exists the information on the sub-RC 7 as a result of the check, the home devices 50 check whether the public key from the sub-RC 7 is identical to the public key contained in the ACL list, and, if identical, create and send a secret key to the sub-RC 7, and authenticate authorization to the sub-RC 7.

The domain key-creating unit 35 creates a domain key for controlling operations between the sub-RC 7 and the home devices 50 of a domain upon operations of each home device 50 forming one domain belonging to one sub-RC 7. The domain key is randomly created, encrypted together with none, session information, and a secret key, and sent to each home device 50 of a corresponding domain. The home devices 50 store a domain key sent from the sub-RC 7 in the memory unit 40, and, upon communications with the RC 5 or 7 or the other home devices 50, decide whether to perform a command depending on whether the domain key is matched when it is confirmed that the domain key is for the domain.

The home devices 50 decide whether to perform a command sent from the sub-RC 7 depending on whether the domain key is matched, upon communications with the sub-RC 7.

The control unit 10 controls operations of the individual units according to a owner's, administrator's, or user's command inputted through the user interface unit 15, and controls the communications with the home devices 50 through the LLC interface unit 25.

Figure 4:
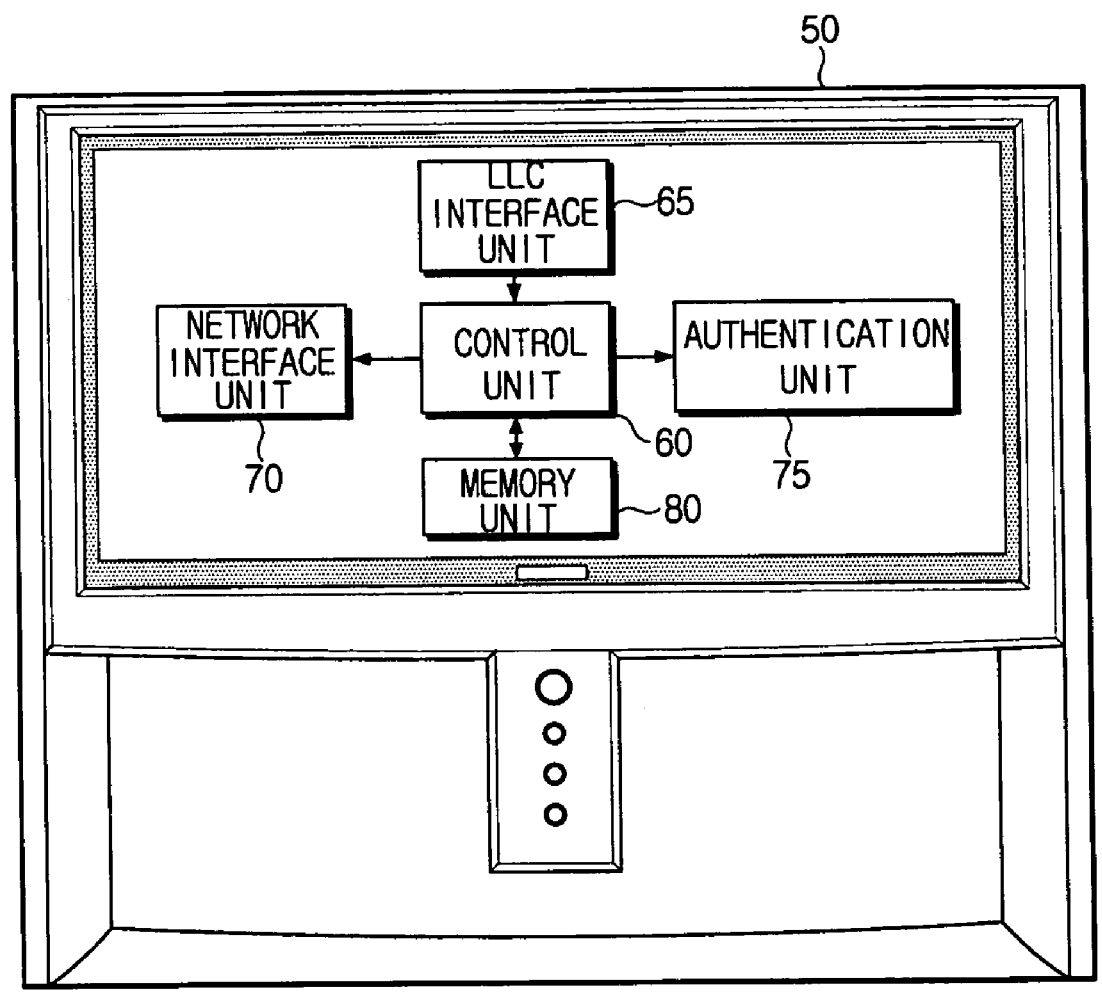
FIG. 4 is a block diagram for showing a structure of a home device according to an exemplary embodiment of the present invention.

Further, as shown in FIG. 4, the home devices 50 each have a memory unit 80, a network interface unit 70, a LLC interface unit 65, an authentication unit 75, and a control unit 60.

The memory unit 80 of each home device 50 stores information on the home devices 50, an ACL list for the sub-RC 7 sent from the main RC 5, and information on the main RC 5, and further stores information on the sub-RC 7 sent from an authenticated sub-RC 7 and information on a secret key shared with the sub-RC 7.

The network interface unit 70 supports wireless communications between a server of a home network and the home devices 50, and the network interface unit 70 may be IEEE802.11b/a, IEEE802.11e, WiMedia, HiperLAN, or the like.

The LLC interface unit 65 supports communications between the RC 5 or 7 and the home devices 50 in association with the LLC interface unit 65 installed in the RC 5 or 7.

Upon authentication requests by the main RC 5 and the sub-RC 7, the authentication unit 75 decides whether the ACL list stored in the memory unit 80 contains information on the sub-RC 7 requesting the authentication. If the information on the sub-RC 7 is contained as a result of the decision, the authentication unit 75 hashes the hash functions for the corresponding sub-RC 7 to decide whether a public key contained in the hash functions is matched to a public key sent from the sub-RC 7. If both public keys are matched to each other, the authentication unit 75 creates a secret key, stores the created secret key in the memory unit 80, and sends the secret key to the corresponding sub-RC 7 to authenticate authorization to use the sub-RC 7. Further, if the authentication unit 75 receives from the sub-RC 7 an encrypted message of a domain key randomly created to specify a domain, the authentication unit 75 decrypts the encrypted message by using the secret key of the corresponding sub-RC 7 which is stored in the memory unit 80, and checks whether the message is encrypted with the same secret key. As a result of the check, if the domain key is sent from the authorized sub-RC 7, the authentication unit 75 stores the domain key in the memory unit 80 by matching with information on the corresponding sub-RC 7, and, when checking if the domain key is for the corresponding domain upon communications with the RC 5 or 7 or the home devices, decides whether to perform a command depending on whether the domain key is matched.

Figure 5:
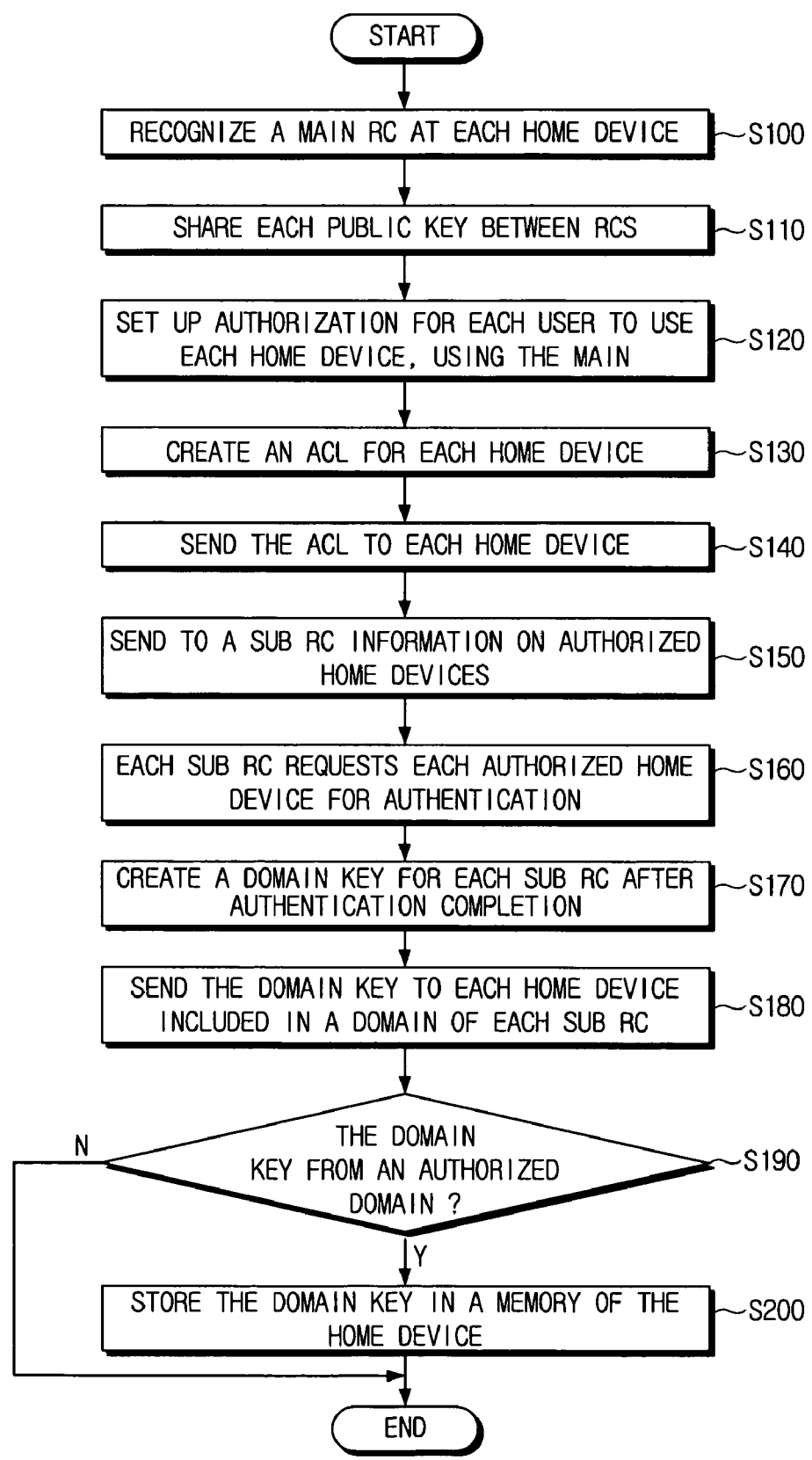
FIG. 5 is a flow chart for showing a domain setup process according to an exemplary embodiment of the present invention.

In the home network having the above structure, a domain setup process depending on a user will be described as below with reference to FIG. 5.

An owner or an administrator owning or administering at least one home device 50 performs a process in order that each home device 50 in the main domain owned or administered by the owner or the administrator recognizes the main RC 5 (S100). First, the owner or the administrator provides the home device 50 with information on the main RC 5 together with a message requesting recognition of the main RC 5, using the main RC 5. Next, the control unit 60 of the home device 50 checks whether the memory unit 80 stores the information on its main RC 5. If there does not exist information on its main RC 5 as a result of the check, the control unit 60 of the home device 50 stores in the memory unit 80 the information on the main RC 5 as its main RC, and the authentication unit 75 creates and stores a secret key for the main RC 5 in the memory unit 80, and sends the secret key to the main RC 5.

Before or after such a process for recognizing the main RC 5 at a home device 50, the owner or the administrator performs a process for the RCs 5 and 7 to share public keys (S110).

Figure 3:
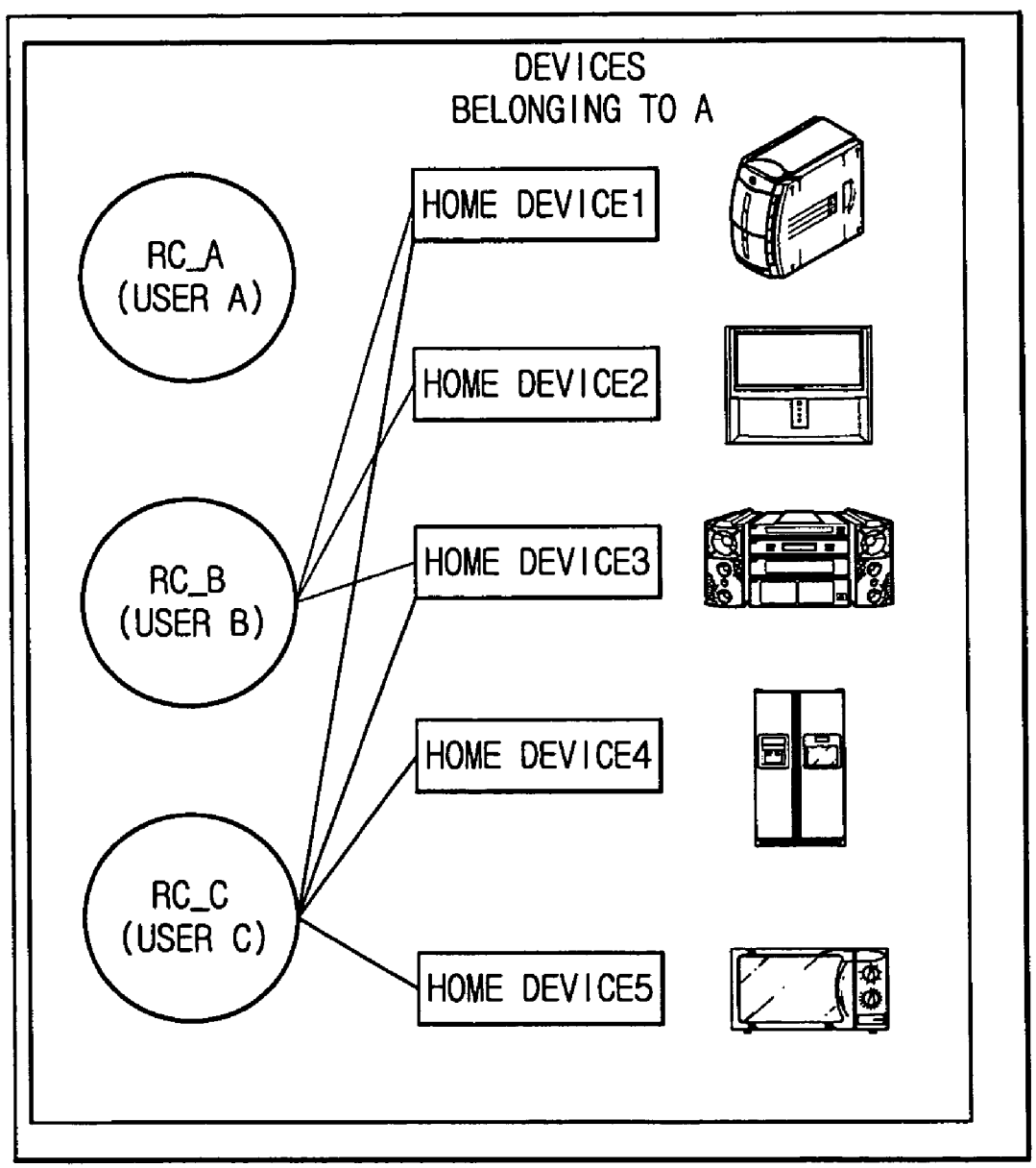
FIG. 3 is a view for showing a window of a main RC for authorization setup according to an exemplary embodiment of the present invention.

If completed with a public key-sharing process or the process for recognizing the main RC 5 at the respective home devices 50 belonging to the main domain for the main RC 5, the owner or the administrator sets up authorization to each user in the home network to use each home device 50, using the main RC 5 (S120). First, if the owner or the administrator uses the main RC 5 to input a command for setting up authorization to use a home device 50, as shown in FIG. 3, the display window of the main RC 5 displays icons for the sub-RCs 7 of each user in a home network and icons for each home device 50 so that authorization can be established by the main RC 5. The owner or the administrator sets up authorization to use each home device 50 at the sub-RCs 7, using a stylus pen, fingers, or separate buttons, or the like. Here, the owner or the administrator can give authorization to use all the home devices 50 or some home devices 50 belonging to each sub-RC 7, or does not give any authorization to use the home devices 50.

If the owner or the administrator uses the main RC 5 to set up authorization to use each home device 50 of a main domain as above, the control unit 10 of the main RC 5 creates an ACL for each home device 50 (S130). Each ACL contains information on the sub-RC 7 accessible to the corresponding home devices 50 and hash information on a public key of the sub-RC 7. If the ACL is completed, the control unit 10 of the main RC 5 sends to each home device 50 an ACL of the corresponding home device 50 through the LLC interface unit 65 (S140). Here, a transmission method has to be designed to be secure against ACL re-transmission attacks. For example, the home device 50 creates and sends none to the main RC 5, and the control unit 10 of the main RC 5 can use a method of sending, together with the ACL, a hash result value obtained when the ACL and nonce are used as input values.

Meanwhile, the corresponding home device 50 that received the ACL stores the ACL in the memory unit 80, and encrypts and sends to the main RC 5 a completion message and a MAC2 corresponding to the MAC1. Further, the control unit 10 of the main RC 5 provides each sub-RC 7 with information on the home devices 50 corresponding to sub-RCs 7 (S150). Here, the main RC 5 does not have to provide each sub-RC 7 with the information on the authorized home devices 50, but the owner or the administrator can notify users owning the sub-RCs 7 of the kinds of the home devices 50 that the users can directly use off-line.

There can exist a plurality of main RCs 5 in one home network, and each step as stated above is independently performed in each main RC 5.

Figure 6:
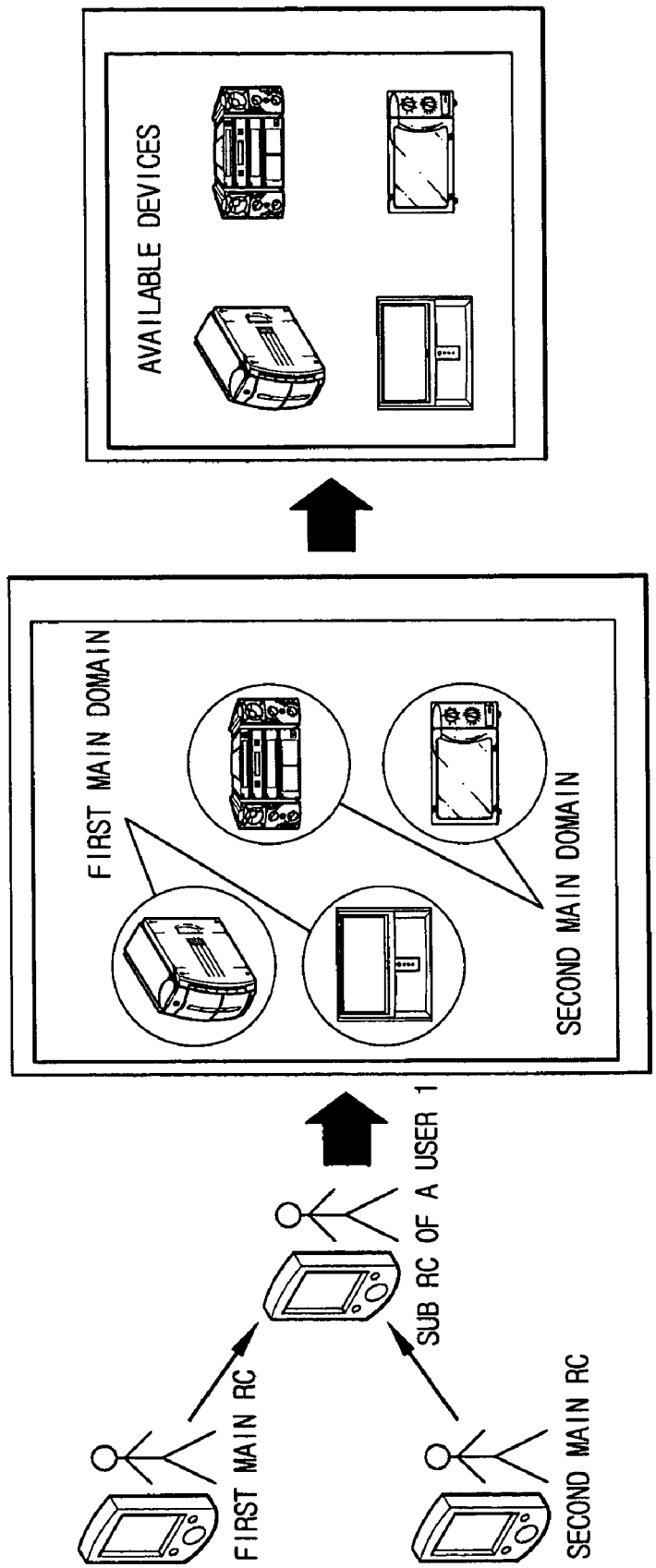
FIG. 6 is a view for conceptually showing the domain setup process of FIG. 5 according to an exemplary embodiment of the present invention.

Meanwhile, since all the home devices 50 can be included in one main domain and in a plurality of domains, each sub-RC 7 can be provided with the information on the home devices 50 to which the plural main RCs 5 can access. For example, as shown in FIG. 6, it is assumed that a main domain controlled by the first main RC is constituted of home devices 50 such as a digital TV, a personal computer, a printer, a washing machine, and so on, and a main domain controlled by the second main RC is built with home devices 50 such as an audio, a microwave range, a DVD, a facsimile machine, and so on. If an owner of the first main RC 5 gives a user 1 authorization to use the digital TV and the personal computer and the owner of the second main RC gives the user 1 authorization to use the audio and the microwave range, the first main RC provides the sub-RCs owned by the user 1 with information on the digital TV and the personal computer and the second main RC provides the same with information on the audio and the microwave range. Thus, each sub RC of the user 1 is provided with information indicating that authorization is given to use the digital TV, personal computer, audio, and microwave range. FIG. 6 shows logical divisions, but the sub-RC of the user 1 can be the same as the main RC of the user 1.

If inputted with the information on the authorized home devices 50 as above, each sub-RC 7 requests the authorized home devices 50 for authentication (S160). Upon the authentication requests, each sub-RC 7 provides the home devices 50 with information on the sub-RC 7 and information on a public key. The home devices 50 compare the ACL stored in the memory unit 80 to the information on the sub-RC 7 provided from the sub-RC 7, and check whether the information on the sub-RC 7 exists in the ACL. If it is determined that the information on the sub-RC 7 exists in the ACL, the authentication unit 75 checks whether the public key provided from the sub-RC 7 is matched to a public key contained in the ACL. If the both public keys are matched, the authentication unit 75 creates and stores a secret key in the memory unit 80, and sends the secret key to the corresponding sub-RC 7 for authentication. Here, when the authentication unit 75 sends the secret key, the authentication unit 75 encrypts the secret key with the corresponding public key in order to check if the sub-RC 7 is a remote controller for the public key, so that only the sub-RC 7 having the secret key for the public key can perform decryption. Next, the sub-RC 7 stores the provided secret key in the memory unit 80.

As indicated above, if the authentication is completed for each home device 50 of a domain belonging to one sub-RC 7, the domain key-creating unit 35 of the sub-RC 7 creates a domain key (S170). Further, the domain key-creating unit 35 encrypts and sends the domain key, using the secret key information of the home devices belonging to its domain stored in the memory unit 80 (S180).

The home devices 50 check which remote controller sends a message, and decrypt the domain key, using the secret key shared with the remote controller. Next, the home devices 50 check if the information is provided from an authorized domain (S190). If the information is provided from the authorized domain as a result of the check, the control unit 60 of the home device 50 stores the domain key in the memory unit 80, matching the domain key to the information on the sub-RC 7 (S200). Next, when checking if a domain is the domain upon communications of the RC 5 or 7 with a home device, the control unit 60 decides whether to perform a command depending on whether the domain keys are matched.

As indicated above, in the present home network, an owner or an administrator of each device 50 gives the other users authorization to use each home devices 50, and sets up one domain with at least one home device 50 authorized to each user. Further, a user forms a secret key for each authorized home device 50, and enables the RC 5 or 7 and home devices 50 of his or her own to share a domain key for communications of the home devices 50 in the same domain, using the secret key.

What is claimed is:

1. A network system capable of communicating with foreign networks and having a plurality of devices capable of mutually communicating with one another, comprising:
at least one main remote controller which sets up authorization to use respective devices belonging to at least one main domain having at least one of the respective devices; and
at least one subsidiary remote controller which receives authentication for authorization to use at least one of the respective devices belonging to said at least one main domain having the respective devices authorized to at least one user by respective main remote controllers,
wherein at least one of the at least one main remote controller and the subsidiary remote controller both sets up authorization to use the respective devices belonging to said at least one domain and receives the authentication for authorization to use said at least one of the respective devices belonging to said at least one domain and is one of the plurality of devices capable of mutually communicating with one another,
wherein a domain key is created to be commonly used for communications with the respective devices in the domain, and wherein the domain key is sent to the respective devices and shared with the respective devices.

2. The network system as claimed in claim 1, wherein the respective main and subsidiary remote controllers mutually share information on a unique public key for identifying the respective main and subsidiary remote controllers.

3. The network system as claimed in claim 2, wherein the respective main remote controllers send to the respective subsidiary remote controllers information on authorization for individual users to use the respective devices.

4. The network system as claimed in claim 3, wherein the respective main remote controllers send to said at least one of the respective devices information containing a public key of said at least one of the respective subsidiary remote controllers authorized to use said at least one of the respective devices.

5. The network system as claimed in claim 4, wherein at least one of the respective subsidiary remote controllers comprises an authentication-requesting unit which sends respective authorized devices the information containing another public key of said at least one of the respective subsidiary remote controllers and requests for authentication for the authorization.

6. The network system as claimed in claim 5, wherein the authentication-requesting unit sends the respective authorized devices said another public key of the at least one respective subsidiary remote controllers.

7. The network system as claimed in claim 6, wherein, if the authentication-requesting unit requests for the authentication, the respective authorized devices compare the public key of the at least one respective subsidiary remote controllers sent from the respective main remote controllers to another public key sent from the at least one of the respective subsidiary remote controllers, and decides whether to authenticate the at least one of the respective subsidiary remote controllers.

8. The network system as claimed in claim 7, wherein, if authenticated, the respective authorized devices create a secret key to share with the at least one respective subsidiary remote controllers, and sends the secret key to the at least one respective subsidiary remote controllers.

9. The network system as claimed in claim 8, wherein, if the secret key is completely shared with the respective authorized devices, the at least one respective subsidiary remote controllers create a domain key for communications with the respective authorized devices in the domain, encrypt the domain key by using the secret key of the respective authorized devices, and send the encrypted domain key to the respective authorized devices.

10. The network system as claimed in claim 9, wherein, if the secret key from the at least one respective subsidiary remote controllers is created in the respective authorized devices, the respective authorized devices perform a command from the at least one of the respective subsidiary remote controllers, using the domain key, upon communications with the at least one of the subsidiary remote controllers.

11. A user domain setup method for a network capable of communicating with foreign networks and having a plurality of devices capable of mutually communicating with one another, comprising:
setting up at least one main domain having at least one of the plurality of devices;
setting up authorization for at least one user to use at least one of the plurality of devices belonging to the main domain;
authenticating authorization for the authorized user to use the respective authorized devices;
setting up in one domain the respective devices authorized and authenticated to the user;
creating a domain key to be commonly used upon communications with the respective devices in the domain; and
sending the domain key to the respective devices and sharing the domain key with the respective devices,
wherein at least one of a main remote controller and a subsidiary remote controller both sets up authorization to use the respective devices belonging to said at least one domain and receives the authentication for authorization to use said at least one of the respective devices belonging to said at least one domain, and is one of the plurality of devices capable of mutually communicating with one another.

12. The method as claimed in claim 11, further comprising mutually sharing with respective main controllers information on a unique public key for identifying respective subsidiary remote controllers, wherein at least one main remote controller sets up the authorization to use the respective devices in the main domain and at least one of subsidiary remote controllers controls operations of the respective devices in the domain.

13. The method as claimed in claim 12, further comprising, by the respective main remote controllers, sending the respective subsidiary remote controllers information on the authorization for individual users to use the respective devices.

14. The method as claimed in claim 13, further comprising, by the respective main remote controllers, sending the respective devices information containing a public key of the respective subsidiary remote controllers authorized to use the respective devices.

15. The method as claimed in claim 14, wherein the operation of authenticating the authorization for use comprises sending the respective authorized devices the public key of the respective subsidiary remote controllers and requesting the authentication for the authorization for use.

16. The method as claimed in claim 15, wherein the operation of authenticating the authorization for use further comprises allowing the authentication to at least one of the respective subsidiary remote controllers, if the public key of the at least one respective subsidiary remote controllers sent from the main remote controller is consistent with another public key sent from the at least one respective subsidiary remote controllers in the respective devices.

17. The method as claimed in claim 16, wherein the operation of allowing the authentication further comprises:
creating a secret key for sharing with the at least one of the respective subsidiary remote controllers; and
sending the created secret key to the at least one of the respective subsidiary remote controllers.

18. The method as claimed in claim 17, wherein the operation of sharing the domain key further comprises:
sending an encrypted domain key from the at least one of the respective subsidiary remote controllers to at least one of the respective devices;
checking whether the domain key is the domain key sent from the at least one respective subsidiary remote controllers; and
storing the domain key if the domain key is determined to have been sent from the at least one respective subsidiary remote controllers as a result of the check.

* * * * *